United States Patent Office 3,092,777
Patented June 4, 1963

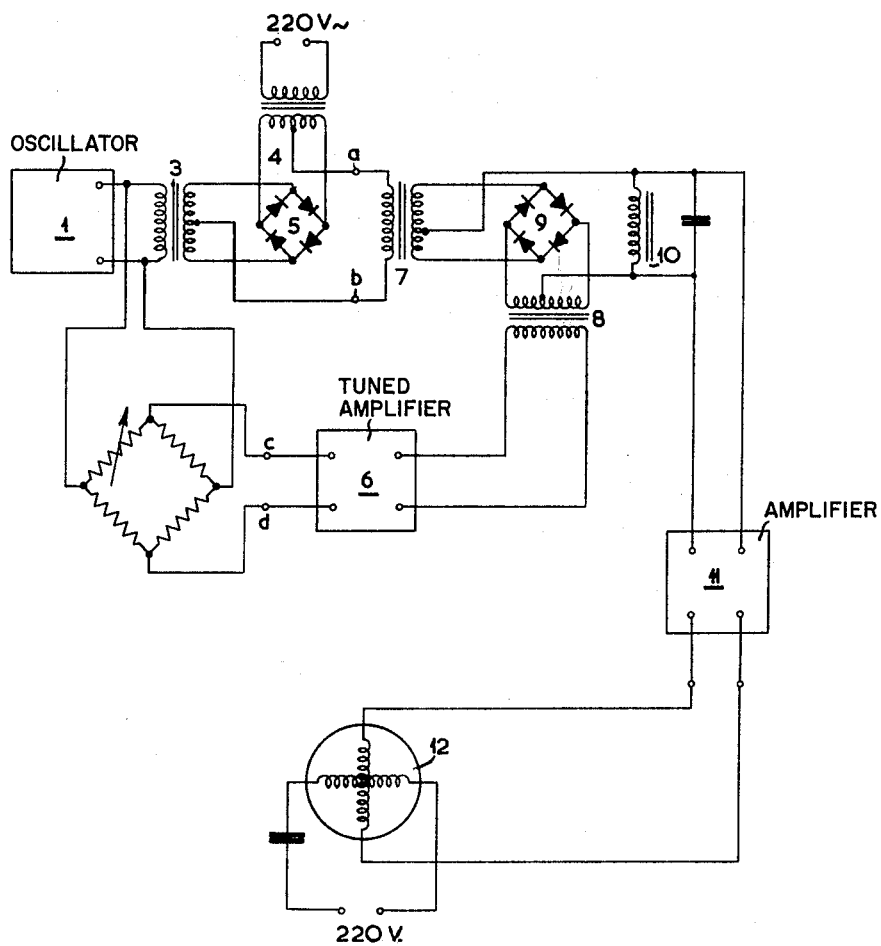
INVENTOR
GEORG RUSCHE
GOTTFRIED GRUNWALDT

3,092,777
CIRCUIT ARRANGEMENT FOR USE IN PHASE-SENSITIVE CONTROL AMPLIFIERS
Georg Rusche and Gottfried Grunwaldt, Hamburg, Germany, assignors to North American Philips Company, Inc., New York, N.Y., a corporation of Delaware
Filed Jan. 23, 1959, Ser. No. 788,602
Claims priority, application Germany Feb. 13, 1958
5 Claims. (Cl. 328—133)

Many regulating systems require a regulation which should be effected at different rates in different directions. For this purpose, for example, use may be made of a servomotor acting as a regulating member and comprising an induction motor having two windings spatially displaced by 90°. One of the windings may be connected, with the interposition of a capacitor producing a phase displacement of 90°, directly to a mains voltage serving as an auxiliary voltage. The second winding is supplied with alternating current of mains frequency from the output of a control amplifier, which alternating current may be phase-displaced by 0° or 180° with respect to the mains voltage or the auxiliary voltage, thus causing the motor to operate clockwise or counterclockwise. The amplitude of the control voltage, which determines the speed of the motor, is found from the measuring values controlling the regulation and is applied to the input of the control amplifier. In regulating systems of this type, the measuring values are converted into mains-frequency alternating voltages the amplitude of which is a measure of the amount and the phase position of which is a measure of the sign of the measuring value. If for example, the measuring value can be converted into resistance variations, the desired amplitude- and phase-dependence is obtainable by connecting the resistor dependent upon measuring values in a bridge which is supplied with the mains frequency and the diagonal of which comprises the amplifier input.

If the measuring value is in the form of a direct voltage, it can be converted into a mains-synchronous alternating voltage by means of vibrator devices supplied with the mains voltage.

It is often necessary to amplify input voltages having such a low value that the critical sensitivity of the amplifier, which is determined by interference fields and noise, must be fully utilized. The interference fields primarily comprise fundamental waves and harmonics of the auxiliary voltage, in particular, when using the mains voltage to this end. As regards noise, the low frequency components are strongest, while the noise energy decreases toward higher frequencies.

The present invention relates to a circuit arrangement for use in phase-sensitive control amplifiers employing an auxiliary or reference voltage for shifting the regulating member. It has the feature that in the measuring-value producer, the measuring value controlling the regulation is converted, by means of a voltage having a frequency higher than that of the auxiliary voltage, into a measuring voltage having the higher frequency and depending in amplitude and phase upon the measuring value. The measuring value is then amplified in a selective amplifier. At the same time a voltage modulated with the auxiliary voltage with suppressed carrier is obtained from the voltage of higher frequency and from the auxiliary voltage by means of a modulator. The modulated voltage, together with the selectively amplified measuring voltage, is applied to a second modulator. At the output circuit of the modulator which is tuned to the frequency of the auxiliary voltage or reference voltage, an alternating voltage is set up which serves as a control voltage. The amplitude of this control voltage is proportional to the amplitude of the derived measuring voltage while its phase displacement with respect to the auxiliary voltage is 0° or 180° dependent upon the phase position of the measuring voltage.

The invention is based on recognition of the fact that, with the same width and consequently the same build-up time of the amplifier, it is feasible to obtain a higher critical sensitivity with respect to noise, by increasing the frequency of the signal to be amplified. The interfering fields resulting from the auxiliary voltage, for example the mains voltage, will appear to a lesser degree as the pass-frequency of the amplifier is more remote from the mains frequency or the auxiliary frequency and its harmonics. This fact also applies for a high frequency at the amplifier input. Limitation of the band-width of the amplifier occurs in the simplest manner by means of resonant circuits. Suppression of the amplification beyond the required frequency band may, however, also be effected by other means. On the other hand, it is often more efficient to operate the regulating member or the servo-motor with mains-frequency current.

The advantage of the regulating system according to the invention over a regulating system operating with a voltage of mains frequency at the measuring-value producer and at the pre-amplifier is that the response sensitivity can be increased by orders of magnitude, and that the pre-amplifier does not practically require special steps for noise-suppression and for shielding interfering fields.

The advantages of a high frequency on the measuring side together with these of a low operating frequency for the regulating member are combined, while the amplified voltage of higher frequency is converted into a voltage of lower frequency, preferably of mains frequency, the amplitude of which is proportional to the high frequency voltage and which voltage of lower frequency is phase-displaced by 0° or 180° with regard to the auxiliary voltage or the mains voltage dependent upon the phase position of the higher frequency.

In order that the invention may be readily carried into effect, an example will now be described in detail with reference to the accompanying drawing:

The drawing is a circuit diagram of a phase sensitive control amplifier according to the invention.

Referring now to the drawing, an oscillator 1, which may comprise a tube or transistor, is provided for producing oscillations having a frequency F higher than the mains frequency and suitable for measuring purposes. Good control is obtainable when the frequency F is as low as 1000 cycles per second. The measuring value is formed from the oscillator by means of a device 2, which may be a measuring bridge. For example, the device 2 may comprise four resistors connected in a bridge, with the oscillations being applied to diagonally opposite junctions and the output terminals $c$ and $d$ being connected to the remaining junctions. One of the resistors is variable in response to given quantity, such as temperature, and may be, for example, a resistor having a negative temperature coefficient of resistance. The measuring voltage at the terminals $c$ and $d$ is thus a voltage of frequency F having an amplitude and phase dependent upon the measuring value. The phase shift of the measuring voltage will be either 0° or 180° with respect to the oscillator voltage.

Moreover, the oscillator voltage is supplied to a ring demodulator 5 by means of a transformer, the secondary of which is center-tapped. The reference voltage, in this case the mains voltage, is supplied to the same ring modulator through a transformer of which the secondary is also center-tapped. In the ring modulator the oscillator frequency is modulated with the mains voltage of, for example, 50 cycles per second. If the oscillator frequency is F only the sideband frequencies F+50 cycles per second and F−50 cycles per second will appear at the output terminals $a$ and $b$.

The measuring voltage appearing on the output terminals c and d of the measuring-value producer 2 is selectively amplified by a tuned amplifier 6 and subsequently, together with the sidebands from the terminals a and b, applied by way of transformers 7 and 8 having center-tapped secondary windings to a second ring-modulator 9. A mains frequency voltage appears at the output of the second ring-modulator. The amplitude of the mains frequency voltage is proportional to the amplitude of the measuring voltage and is displaced in phase by 0° or 180° with regard to the mains voltage or auxiliary voltage according as the measuring voltage is shifted in phase by 0° or 180° with regard to the oscillator voltage. For filtering the high-frequency components out of the output voltage of the second ring modulator 9 a resonant circuit 10 tuned to the auxiliary frequency or mains frequency is provided at the output of the second ring-modulator. This output voltage is amplified by means of an amplifier 11 and is applied to the control winding of a servo-motor 12.

The frequency of the oscillator 1 is not limited to the low frequency range, since it may alternatively be much higher. Furthermore other types of modulators may be substituted for the ring-modulators referred to.

What is claimed is:

1. Means for deriving a control voltage of a first frequency having a phase and amplitude dependent upon a measuring value, comprising a source of said measuring value, a source of alternating voltage of said first frequency, a source of alternating voltage of a second frequency higher than said first frequency, means modulating the alternating voltage of said second frequency with said measuring value to provide a measuring voltage, means modulating said alternating voltage of said second frequency with said alternating voltage of said first frequency, and means for mixing the output of said last-mentioned modulating means with said amplified measuring voltage to provide said control voltage.

2. A phase sensitive control amplifier circuit comprising a first source of alternating voltage of a first frequency, a second source of alternating voltage of a second frequency higher than said first frequency, first modulator means connected to said first and second sources to provide a modulated voltage of said second frequency, measuring value producer means connected to said second source to produce a measuring voltage of said second frequency having a phase and amplitude dependent upon a measuring value, means amplifying said measuring voltage, and mixer means for mixing said modulated voltage with said amplified measuring voltage to provide a control voltage of said first frequency having a phase and amplitude dependent upon said measuring value.

3. A phase sensitive control amplifier circuit comprising a first source of alternating voltage of a first frequency, a second source of alternating voltage of a second frequency higher than said first frequency, first modulator means connected to said first and second sources to provide an output voltage of said second frequency modulated with the voltage of said first frequency, a source of measuring values, means connected to said second source for converting said measuring values into a measuring voltage of said second frequency having a phase and amplitude dependent upon said measuring values, means amplifying said measuring voltage, and mixer means for mixing said modulated output voltage with said amplified measuring voltage to provide a control voltage of said first frequency having a phase and amplitude dependent upon said measuring value.

4. The circuit of claim 3, in which said modulator means and mixer means are ring modulators.

5. The circuit of claim 3, in which said amplifying means comprises a tuned amplifier for selectively amplifying voltages of said second frequency.

References Cited in the file of this patent
UNITED STATES PATENTS 2,476,496   Kliever _____ July 19, 1949
2,931,984   Thompson _____ Apr. 5, 1960